Jan. 23, 1968 J. M. FREET 3,364,558

WHEEL-MOUNTING TOOL

Filed Sept. 12, 1966

INVENTOR.
JEFFERSON M. FREET

BY Kimmel, Crowell & Weaver
ATTORNEYS.

United States Patent Office 3,364,558
Patented Jan. 23, 1968

3,364,558
WHEEL-MOUNTING TOOL
Jefferson M. Freet, 7230 SE. Reed College Place,
Portland, Oreg. 97202
Continuation-in-part of application Ser. No. 419,927,
Dec. 21, 1964. This application Sept. 12, 1966, Ser.
No. 578,808
1 Claim. (Cl. 29—273)

ABSTRACT OF THE DISCLOSURE

A tire tool which includes a shank, a collar on the shank adapted to engage a tire securing stud, the collar being of a diameter less than that of the stud, and a sleeve slidably received on the shank for being slid over the collar and over the stud for supporting a wheel to prevent the holes in the wheel from engaging the threads on the stud during the mounting of a wheel on an automobile is disclosed.

This invention relates to hand tools and more particularly to a tool for mounting wheels onto the hubs of vehicles and constitutes an improvement over United States Patents 1,969,233 to Patterson, 1,999,206 to Patterson, and 3,048,919 to Bald. This application is a continuation-in-part of my copending application Ser. No. 419,927, now abandoned, filed Dec. 21, 1964, and entitled, Wrench and Guide Tool.

Each of the aforementioned patents discloses a hand tool for mounting vehicular wheels on a hub and includes a shank extending through the bolt holes of the wheel with the end of the shank being configured to be received on a hub stud to allow upward pivotal movement of the the tool thereby raising the wheel which is being mounted. As the wheel is raised, it moves by gravity along the shank to a position adjacent the hub so that the user may position the hub on the studs extending away therefrom.

In automobile wheels now in use, the bolt holes are normally inwardly beveled to receive a tapered nut and thereby center the wheel on the studs extending from the hub. One difficulty with the devices of the prior art is that the tapered bolt hole slides along the shank of the tool thereby eroding the beveled bolt hole and consequently off-centering the hole. When the tapered nuts are threaded over the hub studs, the wheel is no longer appropriately centered thereby allowing some free play between the wheel and the hub even though the nuts are tightly fastened.

In brief terms the device of the instant invention comprises a wheel lifting tool equipped with means for obviating the abrasion of the beveled bolt holes thereby precluding the same from becoming off-centered. More specifically, the device of the instant invention comprises a wheel mounting tool having an elongate substantially straight shank slidably receiving a hollow sleeve dimensioned to receive the bolt hole such that raising of the tool results in sliding movement between the sleeve and the shank rather than between the wheel and the shank. It will accordingly be seen that any abrasion of parts will occur between the tool and the sleeve rather than between the wheel and the shank thereby precluding off-centered erosion of the bolt holes.

It is accordingly an object of the instant invention to provide a guide tool which may be used for mounting demountable vehicle wheels while obviating the tendency to abrade the inner surfaces of the bolt holes.

Another object of the instant invention is to provide a guide tool equipped with an elongated and slidable sleeve member providing means to avoid off-centered abrasion of the bolt holes as well as providing means for readily rotating the tool when the tool is reversed to thread the tapered nuts onto the hub studs.

Still another object of the instant invention is to provide a guide tool of the character described in which the collar engaging the hub stud is of lesser diameter than the hub stud itself to allow movement of the wheel over the collar onto the hub stud.

Other objects and advantages of the instant invention reside in the combinations of elements, arrangements of parts, and features of construction and utilization, all as will be more fully pointed out hereinafter and disclosed in the accompanying drawing wherein there is shown a preferred embodiment of this inventive concept.

Figure 1:
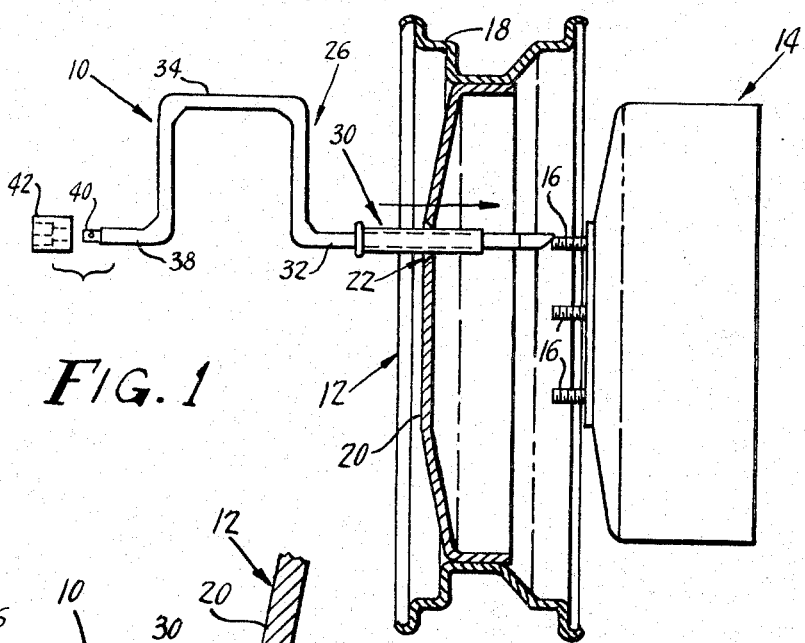
FIGURE 1 is a side elevational view of the guide tool of the instant invention illustrated in operative relation with a vehicle hub and a vehicle wheel shown in cross-section for purposes of illustration.
Figure 2:
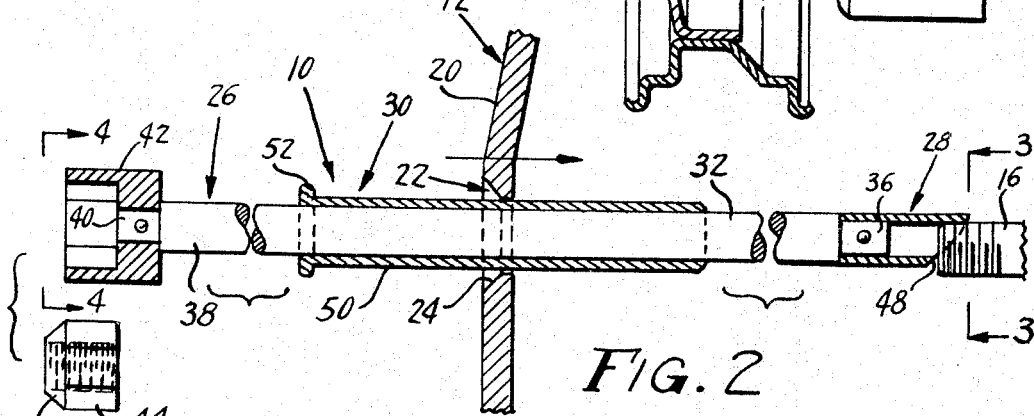
FIGURE 2 is an enlarged longitudinal cross-sectional view of the tool of FIGURE 1 illustrating the operative connection with the hub stud and wheel, certain parts being broken away for clarity of illustrations.
Figure 4:
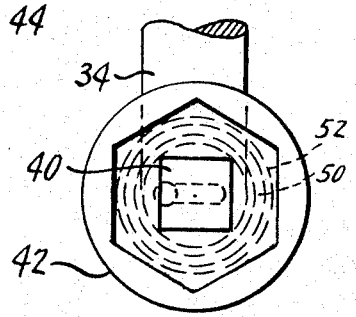
Figure 3:
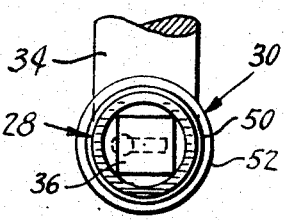

FIGURE 3 is an end elevational view of the guide tool of FIGURES 2 and 3, as may be seen from along line 3—3 of FIGURE 2 as viewed in the direction indicated by the arrows; and FIGURE 4 is an end elevational view of the other end of the tool of FIGURES 1 and 2 as may be seen from along line 4—4 of FIGURE 2 as viewed in the direction indicated by the arrows.

Referring now to the drawing in detail, wherein like reference characters designate like elements throughout the several views thereof, the wheel mounting tool of the instant invention is designated generally at 10 in operative relation to a vehicle wheel shown generally at 12 which is in the process of being mounted onto a vehicle hub shown generally at 14. In the operation of tool 10, the elongate front end thereof will be inserted through one of the bolt holes of wheel 12 with the forward end of tool 10 then being inserted over the end of one of the studs of hub 14. The individual then lifts the free end of tool 10 such that wheel 12 gravitates toward hub 14 and is guided along its path of movement by the end of tool 10.

Hub 14 is illustrated as a conventional vehicular hub and is provided with a plurality of outwardly extending externally threaded bolts or studs 16. Wheel 12 is likewise conventional and includes a circumferential grooved member 18 for receiving a conventional pneumatic or solid tire. A generally circular plate 20 covers the inside diameter of angular member 18 and is provided with a plurality of bolt holes designated generally at 22 having an outwardly flaring beveled edge 24 of a known type.

The wheel mounting tool of the instant invention has as its major components a main body designated generally at 26, a stud receiving socket or collar designated generally at 28 and a sleeve denominated generally at 30 mounted for free slidable movement along main body 26. Main body 26 includes an elongate straight rigid shank 32 of generally circular cross-sectional configuration and an off-set handle 34 illustrated as a U-shaped handle intermediate the ends of main body 26. The end of shank 32 forms a socket receiving detent head 36 removably receiving socket 28 in a conventional manner. The other end of main body 26 includes an extension 38 equipped with a socket receiving detent head 40 on which is removably positioned a conventional nut receiving socket 42. It will be readily apparent that after wheel 12 is positioned on hub 14, tool 10 may be reversed in order to threadably engage a nut 44 having a beveled lower end 46 onto stud 16.

As previously mentioned, collar or socket 28 is configured to be releasably secured on the end of a detent head 36. An important feature of collar 28 is that the external diameter thereof is substantially equal to the diameter of circular shank 32 and is less than the diameter of hub stud 16. It will be evident that sleeve 30 will readily slide along shank 32 and collar 28 in order to position wheel 12 adjacent studs 14. If collar 28 were as large or larger than hub stud 16, collar 30 would of necessity be considerably larger than hub stud 16. If this were so bolt holes 22 would have to be considerably larger than hub stud 16 thereby allowing considerable free play between wheel 12 and hub 14. Accordingly, collar 28 and shank 32 have somewhat smaller diameters than shank 16 while collar 30 is approximately the same diameter as hub stud 16. The terminal end 48 of collar 28 is preferably arcuately tapered in the manner illustrated in FIGURE 2 to allow upward pivotal movement of tool 10 using stud 16 as the fulcrum therefor.

Sleeve 30 includes a metallic casing 50 dimensioned to freely slidably receive shank 32 and is provided with an annular lip 52 as shown best in FIGURE 2. The external diameter of tubular casing 50 is such as to relatively closely receive bolt hole 22 of wheel 12. Accordingly, the diameter of casing 50 is approximately equal to that of stud 16. After wheel 12 has been inserted over sleeve 30, as shown in FIGURES 1 and 2, collar 28 is positioned on the outer end of hub stud 16. The opposite end of tool 10 is then raised to allow for gravitational sliding of wheel 12 and collar 30, as a unit, along shank 32 until wheel 12 is positioned immediately adjacent stud 16. Wheel 12 may then be slidably moved along a short portion of collar 30 until bolt hole 22 is immediately adjacent stud 16. Collar 30 may be retracted from engagement with bolt hole 22 by grasping lip 52 and pulling away from stud 16. Wheel 12 may then be slidably moved onto stud 16 to complete the mounting operation.

Tool 10 may then be reversed with socket 42 receiving nut 44 for threadably engaging nut 44 onto stud 16 thereby affixing wheel 12 to hub 14. It will be readily apparent that the device of the instant invention minimizes sliding movement tending to abrade and enlarge bolt hole 22 thereby precluding the creation of an off-center hole tending to allow relative movement between hub 14 and wheel 12.

It is now seen that there is herein provided an improved wheel mounting tool which accomplishes all of the objects of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:
1. A wheel mounting tool for mounting a demountable vehicle wheel onto a hub comprising:
an elongate straight rigid main body of substantially circular cross-section;
an off-set handle on the main body;
a hollow collar, rigidly affixed on one end of the main body, providing means for receiving a hub stud to allow pivoting of the main body on the stud, said collar being of a diameter not greater than the diameter of the stud; and
a hollow sleeve freely slidably receiving the main body and normally positioned between the handle and the collar and freely slidable throughout the entire length of the main body, the sleeve being dimensioned to slide freely over the collar and the stud for supporting the mountable wheel and sliding along the shank with the mountable wheel as the tool is pivoted on the hub stud, the sleeve being dimensioned to extend into the bolt holes of the demountable wheel for protecting the normally beveled edges thereof.

References Cited

UNITED STATES PATENTS

| | | | |
|---|---|---|---|
| 1,969,233 | 8/1934 | Patterson | 29—273 |
| 1,999,206 | 4/1935 | Patterson | 29—273 |
| 3,048,919 | 8/1962 | Bald | 29—273 |

FOREIGN PATENTS

| | | |
|---|---|---|
| 779,150 | 7/1957 | Great Britain. |
| 702,461 | 1/1931 | France. |

OTHELL M. SIMPSON, *Primary Examiner.*

R. V. PARKER, *Assistant Examiner.*